United States Patent [19]
Ahdoot

[11] Patent Number: 5,644,078
[45] Date of Patent: Jul. 1, 1997

[54] OPTICAL GYROSCOPE

[76] Inventor: Ned Ahdoot, 6916 Kings Harbor Dr., Rancho Pales Verdes, Calif. 90275

[21] Appl. No.: 537,464

[22] Filed: Oct. 2, 1995

[51] Int. Cl.$^6$ ............................................. G01C 21/00
[52] U.S. Cl. ............................................. 73/178 R; 73/180
[58] Field of Search ............................ 73/178 R, 180, 73/181

[56] References Cited

U.S. PATENT DOCUMENTS

| | | | |
|---|---|---|---|
| 3,625,083 | 12/1971 | Bose | 74/471 |
| 4,939,508 | 7/1990 | Lawrence et al. | 340/710 |
| 5,168,221 | 12/1992 | Houston | 324/207.13 |
| 5,371,589 | 12/1994 | Martin | 356/350 |
| 5,371,591 | 12/1994 | Martin et al. | 356/350 |

*Primary Examiner*—Elizabeth L. Dougherty
*Attorney, Agent, or Firm*—Gene Scott—Patent Law & Venture Group

[57] ABSTRACT

An orientation monitoring apparatus includes an inner spherical shell rigidly fixed within an outer spherical shell, and a spherical ball positioned between the two shells. The inner shell has a polar coordinate grid impressed on it so that the position of the ball relative to the grid is seen from above. An inertial platform is rotationally interfaced with the inner shell. This platform supports a video camera with a view of the grid and ball. As well, the platform supports a motor driven fly-wheel which keeps the platform in a desired horizontal attitude. The motor, camera and a computer are driven by a solar cell and storage battery also mounted onto the platform and which receives energy through the transparent shells. An optical recognition software driven by the computer, is used to automatically compute the movements of the ball relative to the grid so that rotational movements of the shells can be computed in three-space.

11 Claims, 2 Drawing Sheets

OPTICAL GYROSCOPE

BACKGROUND OF THE INVENTION

1. Field of the Invention

This invention relates generally to position monitoring devices which use inertial principles, such a gyroscopes, and more particularly to an improved, inexpensive apparatus designed to automatically monitor a vehicle's position through the monitoring of attitude changes and accelerations.

2. Description of Related Art

Invention and use of position sensing devices is known to the public, as they are frequently employed to sense and monitor the position of a wide variety of different objects. For example, such devices are frequently employed in mouse or trackball configurations, as seen in Bose U.S. Pat. No. 3,625,083. As disclosed, this device consists of a two-axis digital track ball encoder that has a manually controlled bearing-supported spherical ball which, when rotated, actuates two rotatable encoders frictionally coupled to the ball surface and oriented 90 degrees from each other so that the output of one encoder represents an X function and the other a Y function.

Lawrence et al. U.S. Pat. No. 4,939,508 discloses a point and select device in which a sphere protruding from one major surface of a housing can serve as either a trackball or the moving element in a mouse. Actuators on either side of the device are selected according to the use of the device. The sense of motion for up/down is reversed between the two modes of operation.

Houston U.S. Pat. No. 5,168,221 discloses a pivotal magnetic coupling and position sensor that has two torodial magnets coupled to each other by a ferrous spherical spacer. The spacer partially engages openings provided in the two magnet surfaces facing each other. The facing magnet surfaces have the same polarity so that they repel one another. The configuration creates a stable equilibrium by conduction of the magnetic flux through the spacer and the repulsive forces at the periphery of the magnets. This structure forms a resilient pivot joint at which, when capped by a spherical handle attached to the upper magnet, becomes a multiple-axis pointing device or tactile sensor.

Gyroscopes are another common application for position sensing and monitoring devices, as gyroscopes commonly are employed to keep moving vehicles such as ships, airplanes and missiles on course. There are a wide variety of different types of gyroscopes that are currently in use today. Originally, gyroscopes generally consisted of a heavy, rotating wheel or disk mounted so that its axis could turn freely in one or more directions. More recently, however, fiber optic and ring laser gyroscopes have replaced spinning mass machines.

For example, Martin U.S. Pat. No. 5,371,589 discloses a monolithic triaxial ring laser gyroscope that includes three orthogonal ring cavities, the optical path length of each of which is independently controllable. Three planar ring cavities are formed within a frame that is shaped into the form of a rhombic dodecahedron. A mirror is fixed to each of the twelve faces of the frame for directing the counter propagating light beams within the three orthogonal cavities. Anodes which communicate with the cavities through bore holes are fixed to predetermined surfaces of the frame while three cathodes are positioned at flattened portions of preselected vertices of the dodecahedron and located in such a way as to eliminate undesired bias. Martin et al. U.S. Pat. No. 5,371,591 discloses a somewhat similar multioscillator.

The types of instruments described above are complex precision machines having high original cost of procurement, high cost of operation, and significant cost of personnel training and so on. In addition, the present instrument for monitoring position change, tilt, accelerations, etc. are not generally of very high precision, so that they are not applicable to applications requiring low precision, ease of use and simplicity of operation. The present invention fulfills these needs and provides further related advantages as described in the following summary.

SUMMARY OF THE INVENTION

The present invention is an improved gyroscope designed to sense and monitor the position of an object relative to an initial calibrated position, such as on a ship, aircraft or the like. The device consists generally of a housing comprising a pair of hollow, thin-walled spheres, one contained within the other in a concentric relationship. Both spheres are constructed of transparent material, the inner sphere having a polar coordinate grid fixed to it by silk-screening, printing or the like. Being concentric, the spheres have a fixed and uniform distance between them. The spheres are mounted fixedly within, or on, a vehicle or body which generally undergoes some form of motion due to vehicle motion, earthquate, etc. Such a body may be a vehicle such as a land transport, ship or aircraft of some type. A ball, such as a precision ball bearing, is positioned in the space between the spheres, resting on an inner surface of the outer sphere and able to move freely on this surface, so that it naturally seeks the lowest point on the surface. The spheres are initially oriented with respect to the vehicle or body such that the gravity vector which passes through the center of the spheres also passes through the origin point of the polar coordinate grid, and, of course, also through the center of the ball. Should the body assume a different attitude, the gravity vector passing through the center of the spheres will continue to pass through the center of the ball since the ball will move to a new lowest point on the surface thereby aligning itself with the gravity vector. In addition to rotational movements due to gravitational forces, the ball also moves due to external accelerations in any direction. Therefore, all movements of the ball are a precise measure of the vector addition of the rotational movement of the vehicle plus external acceleration forces. As the ball moves in response to these forces, the origin of the coordinate system will no longer be aligned with that gravity vector. A frame is mounted within the inner sphere diametrically across the center and is in rolling contact with the inner surface of the inner sphere. This frame supports a video camera, an electronic control device and data processor, a power source and an inertial rotating mass or fly-wheel. With the fly-wheel at operating speed, the optical center axis of the fly-wheel is aligned with the previously described gravity vector and due to the inertial orienting forces of the fly-wheel, it remains so, always pointing downwardly with the center of the ball aligned on the optical axis of the camera, so that the ball always is at the center of the field of view of the camera. An visual element analysis software program is incorporated within the control device and data processor, so that positions of the ball relative to the origin of the grid system are determined and rotational angles of the spheres are continuously calculated. The grid movements due to pitch, yaw and roll of the vehicle are measured against the stable platform that the camera is mounted on, and external accelerations do not affect this measurement. The computer software automatically deducts the vector movements of the ball from the vector movements of the grid to obtain the instantaneous acceleration force. Instantaneous acceleration forces are integrated for a period of time to measure distances traveled in any direction. Thus it is an object to provide an improved gyroscope capable of precisely monitoring any change in attitude of an object.

Preferably, electrical power for operating the various components of the above system is derived from a solar panel and electricity storage device mounted to the frame and facing upwardly therefrom. Such a device preferably has a flat surface and is ring shaped. Solar energy passes through the spheres to the solar panel. The storage device is integral with the panel. Thus it is an object of the present invention to provide for powered operation without the need for electrical conductors for input power.

Another object of the present invention is to provide for transmission of data from the apparatus to a remote receiver by wireless means, thereby eliminating the need for output electrical signal conductors for telemetry.

It is another object of the present invention to include a means for dampening motion of the ball. The means for dampening motion may consist of a viscous fluid positioned between the inner and outer shells, or it may include fabricating the ball from a high weight density material. In addition, the exterior or interior surface of the outer sphere is covered with a magnetic material to cancel oscillations caused by external forces to the ball. This magnetic material may be a transparent thin-film coating of an iron alloy such as ferris oxide. Other forms of dampening are possible and are included within the scope and spirit of this invention.

The invention may also include a second ball restricted to move in a plane within the inner sphere and within the field of view of the camera. As the spheres are rotated the second ball is acted upon by gravity and external acceleration forces such that it moves on the plane. The acceleration of the second ball is an indicator of acceleration forces on the apparatus. Thus it is an object of the present invention to most effectively determine external acceleration forces which act upon the apparatus.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention, a visual gyroscope. In such drawings.

DETAILED DESCRIPTION OF THE PREFERRED EMBODIMENT

Figure 1:
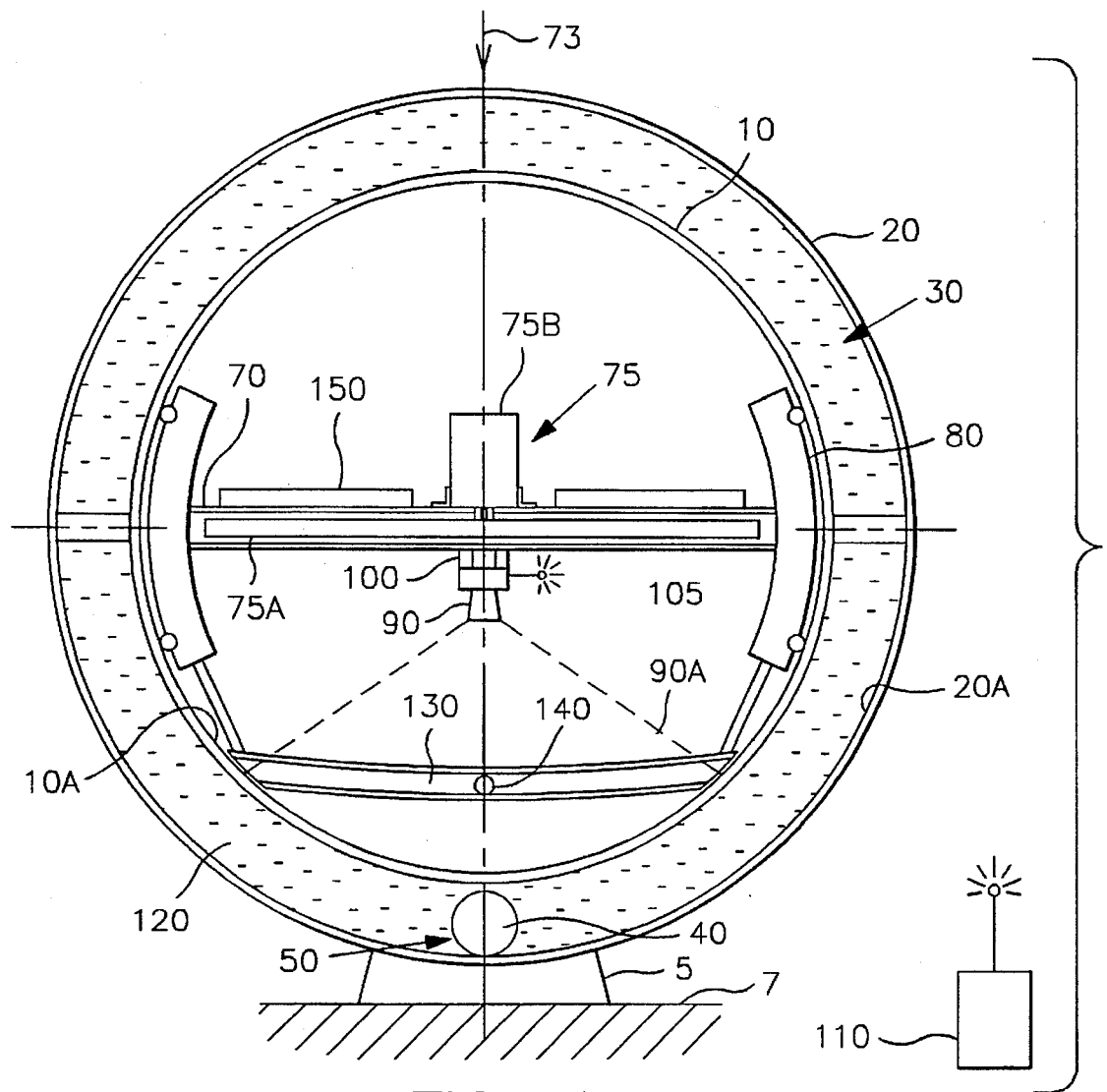
FIG. 1 is an elevational view of a section of the pair of spheres of the present invention.

FIG. 1 shows the apparatus of the present invention which is designed to monitor pitch, yaw, roll and acceleration of a vehicle, robotic arm, earthquake or other such moving object or event. The apparatus provides a pair of transparent spherical thin walled shells including an inner shell 10 and an outer shell 20. These shells should be fabricated of a structural plastic, as for instance, polycarbonate. The two shells are fixed concentrically so that they have a fixed space 30 between them. The spheres are rigidly fixed to the vehicle so that they move with it experiencing rotations and accelerations mutually. In one preferred embodiment, illustrated in FIG. 1, the spheres 10 and 20 are mounted to a sphere mounting stand 5, which is itself mounted to a vehicle surface 7. However, it should be noted that there are numerous other ways, well known in the art, by which to mount the spheres to the vehicle so that the spheres are integral with it.

Figure 2:
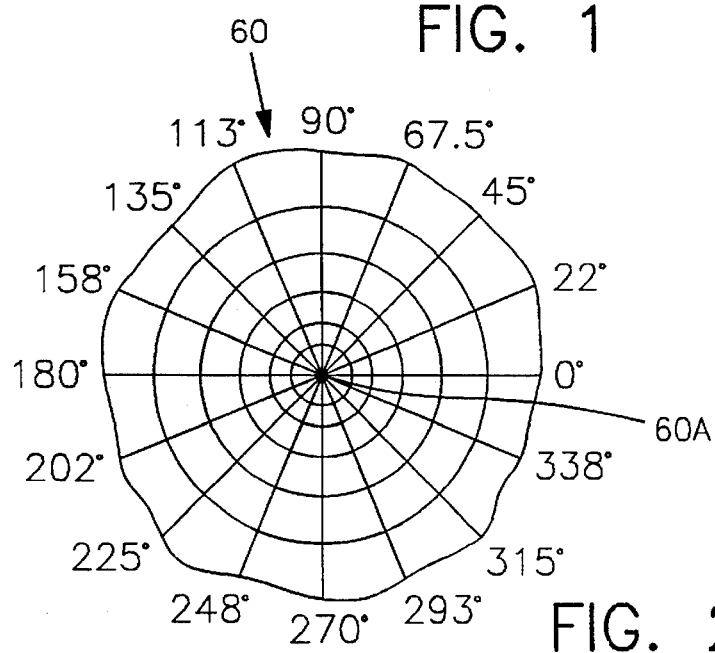
FIG. 2 is a plan view of a polar coordinate grid of the invention.
Figure 3A:
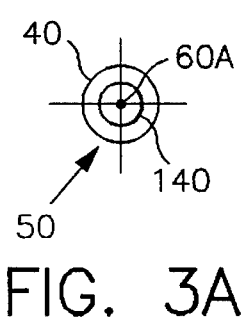
FIG. 3A is a plan view of a portion of the grid of FIG. 2 showing also, the balls of the invention at a nominal initial position when aligned with the origin of the grid.
Figure 3B:
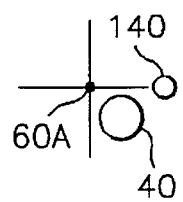
FIG. 3B is the plan view of FIG. 3A showing the balls of the invention when moved off grid origin.

A first precision spherical ball 40 is positioned between the inner 10 and the outer shell 20 and is free to roll on an inner surface 20A of the outer shell 20 in response to pitch, yaw and roll of the vehicle as well as to external acceleration forces. Under the influence of gravity, the ball 40 naturally positions itself at a selected initial position 50 on the outer shell 20. This position 50 is the lowest point on the sphere's surface 20A. The ball 40 is free to roll in any direction on the inner surface 20A of the outer shell 20, but it cannot move upwardly since it is restrained by inner shell 10. A polar coordinate grid 60, as shown in FIG. 2, is printed or silk-screened, etc. on an inner surface 10A of the inner shell 10, the grid providing an origin point 60A of the polar coordinate grid 60, the origin point 60A being centered on the first ball 40 when it is at the initial position 50. This condition is shown in FIG. 3A.

Figure 4:
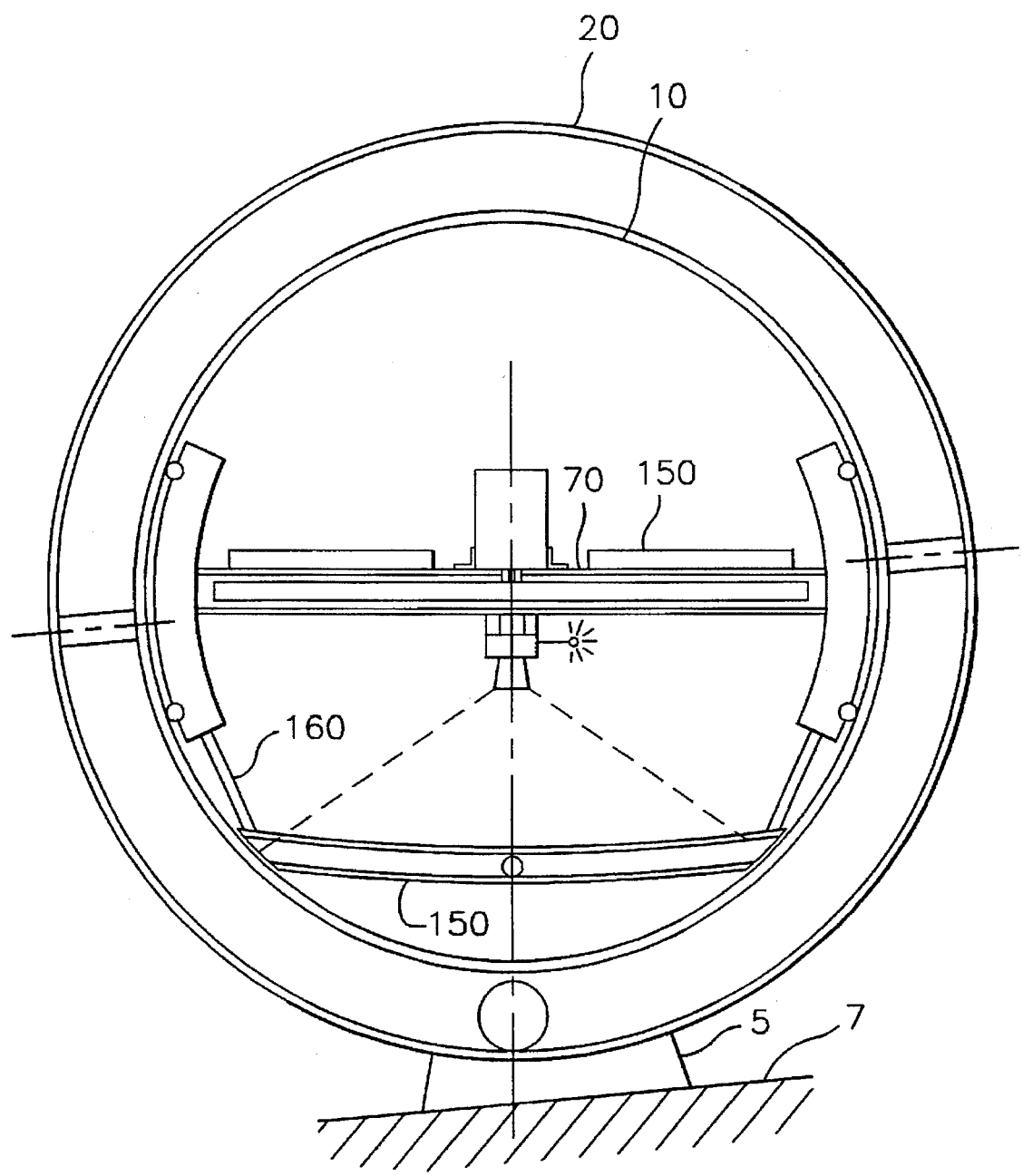
FIG. 4 is a view of FIG. 1 showing the spheres in a rotated orientation.

A support frame 70 extends between diametrically opposing portions of the inner shell 10, as seen in FIGS. 1 and 4. The support frame 70 is rotatably supported on the inner surface 10A of the shell by a bearing means 80, preferably carriages as shown in FIG. 1, that provide for very low friction movement of the support frame 70 relative to the inner shell 10. The support frame 70 has a rotating mass 75 mounted within it. The rotating mass 75 establishes a fixed inertial position of the flame 70 so as to urge the support frame 70 to maintain a fixed spacial orientation, in this case, the rotational axis of the rotating mass is aligned with the gravity vector 73 or vertical, and the plane in which the mass 75 rotates is horizontal. Preferably, as illustrated in FIG. 1, the rotating mass 75 consists of a fly wheel 75A driven by a motor 75B. An imaging means 90, such as a video camera, is engaged with the support frame 70 and is directed downwardly toward the spheres so as observe a field of view 90A that is nominally centered on the coordinate grid origin point 60A. The imaging means 90 provides a signal containing field of view image information to a data processor 100 also engaged with the frame, such information being an indicator of pitch and yaw of the base but not an indicator of external acceleration forces.

The data processor 100 has a means for optical recognition (not shown) which is able to identify the ball 40 and the grid system optically, so as to identify the location of the spherical ball 40 with respect to the polar coordinate grid origin point 60A whenever the spheres experience any rotation. Such optical recognition means are well known in the art, and generally provide for software routines that can find a selected object shape and size within a field of view which might contain tens or even hundreds of objects of various shapes and sizes. The processor 100 also provides an output signal that identifies the ball's location on the grid 60 and includes information related to the polar coordinates (r,p) of the ball 40 relative to the origin point 60A. The processor 100 deducts pitch and yaw movement information from acceleration induced movements in order to determine the magnitude of each influence alone. Interconnected with the data processor 100 is a communication means 105 that transfers an output signal from the data processor 100 to a data receiving means 110 external to the apparatus. This is preferably accomplished by wireless communication.

Preferably, a solar panel and battery means 150 is mounted to the support frame 70 so as to be electrically interconnected with the rotating mass 75, the data processor 100 and other such components of the apparatus which are driven by electrical power. The means 150 is preferably a disk shaped planar solar receiving display as is well known in the art, and is mounted onto a disk shaped storage battery which provides drive power.

The apparatus preferably includes a nominally horizontally oriented tube 130 positioned within the field of view of the imaging means 90. The tube 130 contains a second spherical ball 140 that is free to roll within the tube 130. When the apparatus experiences an acceleration, this ball, of a different size from the first ball for optical recognition reasons, experiences a change in velocity and position. These movements are recognized by the optical recognition means and converted into output signals containing the information necessary to understand how the vehicle is moving.

Preferably, the device includes a means 120 for dampening the motion of the first spherical ball 40. There are numerous possible embodiments of the dampening means 120 that may be successfully implemented within the present invention. In one preferred embodiment, illustrated in FIG. 1, the dampening means 120 consists of a viscous fluid positioned between the inner 10 and the outer shells 20, and, in another preferred embodiment, the dampening means 120 includes fabricating the ball 40 from a high weight density material. The apparatus may also include similar means 120 for dampening the motion of the second spherical ball 140. Such dampening would be most applicable to systems which are slowly changing.

Still further, the apparatus preferably includes a compass means (not shown). The compass means may be positioned within the imaging means 90 field of view for interpretation by the optical recognition means, or alternately, it may consist of an electromagnetic device providing heading information directly to the data processor 100 which then would integrate such heading information into equations for determining vehicle movements.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. An apparatus comprising;

a pair of spherical shells including an outer shell and a transparent inner shell fixed concentrically within the outer shell, the shells providing a fixed space therebetween;

a first spherical ball positioned between the inner and the outer shell and free to roll on an inner surface of the outer shell, the first ball, under the influence of gravity, positioning itself at a selected initial position on the outer shell;

a polar coordinate grid fixed to an inner surface of the inner shell, the grid providing an origin point of the polar coordinate grid, the origin point being centered on the first ball when the first ball is at the initial position;

a support frame extending between diametrically opposing portions of the inner shell and rotatably supported thereon by a bearing means for providing low friction movement of the support frame relative to the inner shell, the support frame having a rotating mass mounted therein, the rotating mass establishing a fixed inertial position of the frame so as to urge the support frame to maintain a fixed spacial orientation, an imaging means engaged with the support frame and directed for observing a field of view nominally centered on the coordinate grid origin point, the imaging means providing a signal containing field of view image information;

a data processor including a means for image element recognition interconnected with the imaging means so as to receive the information signal and to identify the location of the spherical ball with respect to the polar coordinate grid origin point when the apparatus is rotated, the processor further providing an output signal identifying the ball location on the grid.

2. The apparatus of claim 1 wherein the output signal includes information related to the polar coordinates of the ball relative to the origin point to determine magnitude of rotation of the spheres, and information related to rate of rotation of the spheres.

3. The apparatus of claim 1 further including a means for dampening motion of the spherical ball.

4. The apparatus of claim 3 wherein the dampening means is a viscous fluid filling the fixed space between the inner and the outer shells.

5. The apparatus of claim 3 wherein the dampening means includes fabricating the ball from a high weight-density material.

6. The apparatus of claim 1 further including a nominally horizontally oriented tube positioned within the field of view, the tube containing a second spherical ball free to roll within the tube.

7. The apparatus of claim 6 further including a means for dampening motion of the second spherical ball.

8. The apparatus of claim 7 wherein the dampening means is a viscous fluid filling the tube.

9. The apparatus of claim 7 wherein the dampening means includes fabricating the second ball from a high weight-density material.

10. The apparatus of claim 1 further including a communication means for transferring the output signal from the data processor to a data receiving means external to the apparatus.

11. The apparatus of claim 10 further including a solar-powered battery means electrically interconnected with the data processor, the communication means and the rotating mass for providing power thereto.

* * * * *